US007739047B2

(12) United States Patent
Meunier et al.

(10) Patent No.: US 7,739,047 B2
(45) Date of Patent: Jun. 15, 2010

(54) METHOD AND DEVICE FOR EVALUATING THE LICITNESS OF THE SITUATION OF A CRAFT ON THE SURFACE OF AN AIRPORT

(75) Inventors: Hugues Meunier, Frouzins (FR); Nicolas Marty, Saint Sauveur (FR)

(73) Assignee: Thales (FR)

( * ) Notice: Subject to any disclaimer, the term of this patent is extended or adjusted under 35 U.S.C. 154(b) by 757 days.

(21) Appl. No.: 11/529,336

(22) Filed: Sep. 29, 2006

(65) Prior Publication Data

US 2007/0078592 A1 Apr. 5, 2007

(30) Foreign Application Priority Data

Sep. 30, 2005 (FR) .................................. 05 10016

(51) Int. Cl.
*G05D 1/02* (2006.01)

(52) U.S. Cl. ...................................... 701/300; 701/120

(58) Field of Classification Search ................. 701/120, 701/300; 340/998
See application file for complete search history.

(56) References Cited

U.S. PATENT DOCUMENTS 5,687,149 A 11/1997 Meunier
5,706,011 A * 1/1998 Huss et al. .................... 342/65
5,736,955 A * 4/1998 Roif ............................ 342/33
6,088,654 A * 7/2000 Lepere et al. ............... 701/301

(Continued)

FOREIGN PATENT DOCUMENTS

WO 03/107299 A 12/2003

(Continued)

OTHER PUBLICATIONS

Jones, D. R. et al. "Airport Surface Movement Technologies-Atlanta Demonstration Overview", Digital Avionics Systems Conference, 1998, Proceedings., 17th Dasc. The AIAA/IEEE/SAE Bellevue, WA, USA Oct. 31-Nov. 7, 1998, New York, NY, USA, IEEE, US, vol. 2, Oct. 31, 1998, pp. F21-1, XP010318167, ISBN: 0-7803-5086-3.

(Continued)

*Primary Examiner*—Jack W. Keith
*Assistant Examiner*—Rami Khatib
(74) *Attorney, Agent, or Firm*—Lowe Hauptman Ham & Berner, LLP

(57) ABSTRACT

A method for evaluating the licitness of the situation of a craft on the surface of an airport including the steps of: modelling of a first licitness cost surface covering a surface of the airport where the craft is deploying, termed the deployment surface, related to this deployment surface and defined by quantities assigned to its points, which quantities are representative of their memberships in flow constraint zones and of the severity in relation to the craft, of the flow constraints, modelling of a second licitness cost surface covering the deployment surface, related to the craft and defined by quantities assigned to its points, which quantities are representative of their memberships in a girth zone covering a neighborhood of the current position of the craft, and calculation of a score evaluating the significance of the risk of violation of a flow constraint incurred by the craft on the basis of a cross-correlation function of the two licitness cost surfaces referred to one and the same benchmark.

16 Claims, 9 Drawing Sheets

U.S. PATENT DOCUMENTS

| | | | | |
|---|---|---|---|---|
| 6,317,663 | B1 | 11/2001 | Meunier et al. | |
| 6,480,120 | B1 | 11/2002 | Meunier | |
| 6,510,244 | B2 * | 1/2003 | Proesmans et al. | 382/203 |
| 6,606,563 | B2 * | 8/2003 | Corcoran, III | 701/301 |
| 6,920,390 | B2 * | 7/2005 | Mallet et al. | 701/120 |
| 7,117,089 | B2 * | 10/2006 | Khatwa et al. | 701/301 |
| 7,120,540 | B2 * | 10/2006 | Meunier | 701/301 |
| 7,321,813 | B2 | 1/2008 | Meunier | |
| 7,495,758 | B2 * | 2/2009 | Walton | 356/237.1 |
| 2003/0107499 | A1 | 6/2003 | Lepere et al. | |
| 2004/0133341 | A1 * | 7/2004 | Spriggs | 701/200 |
| 2004/0225432 | A1 * | 11/2004 | Pilley et al. | 701/117 |
| 2004/0225440 | A1 * | 11/2004 | Khatwa et al. | 701/301 |
| 2005/0182557 | A1 * | 8/2005 | Smith et al. | 701/120 |
| 2007/0031007 | A1 | 2/2007 | Bitar | |
| 2007/0050101 | A1 * | 3/2007 | Sacle et al. | 701/11 |
| 2007/0053609 | A1 | 3/2007 | Bitar et al. | |
| 2007/0150117 | A1 | 6/2007 | Bitar et al. | |
| 2007/0150121 | A1 | 6/2007 | Bitar et al. | |
| 2007/0174005 | A1 | 7/2007 | Bitar et al. | |
| 2007/0185652 | A1 | 8/2007 | Salmon et al. | |
| 2007/0187554 | A1 | 8/2007 | Bitar et al. | |
| 2007/0276553 | A1 * | 11/2007 | Bitar et al. | 701/3 |
| 2007/0285283 | A1 * | 12/2007 | Bitar et al. | 340/963 |
| 2008/0316462 | A1 * | 12/2008 | Riel et al. | 356/3 |

FOREIGN PATENT DOCUMENTS

| | | | |
|---|---|---|---|
| WO | WO 03/107299 | | 12/2003 |
| WO | WO 03107299 | A2 * | 12/2003 |

OTHER PUBLICATIONS

Jones D R et al: "Airport surface movement technologies-Atlanta demonstration overview" Digital Avionics Systems Conference, 1998. $17^{th}$ dasc. The AIAA/IEEE/SAE Bellevue, WA, USA Oct. 31-Nov. 7, 1998, New York.

Sharon Otero Beskenis et al, entitled "Intergrated Display System For Low Visibility Landing and Surface Operations" published in Jul. 1998 under the referenced NASA/CR-1998-208446.

* cited by examiner

METHOD AND DEVICE FOR EVALUATING THE LICITNESS OF THE SITUATION OF A CRAFT ON THE SURFACE OF AN AIRPORT

RELATED APPLICATIONS

The present application is based on, and claims priority from, France Application Number 05 10016, filed Sep. 30, 2005, the disclosure of which is hereby incorporated by reference herein in its entirety.

BACKGROUND OF THE INVENTION

1. Field of the Invention

The present invention relates to the assisting of an airport craft (vehicle, aircraft) in respect of compliance with taxiing constraints. It more particularly pertains to the detection, the evaluation and the signalling to an airport craft of any abnormal situation of the craft in the highly regulated environment of an airport.

2. Description of the Related Art

Since the sizeable reduction in air accidents due to a collision with the ground of an aircraft that is still manoeuvring, so-called CFIT type accidents (the acronym standing for the expression: "Controlled Flight Into Terrain"), obtained with TAWS ground collision prevention systems (the acronym standing for the expression: "Terrain Awareness and Warning System), the main cause of air accidents is now becoming airport collisions on the ground between aeroplanes or other craft.

The main reason for these ground traffic accidents in airports, commonly known by the expressions "Runway Incursion" or "Runway Intrusion", is the unauthorized encroachment of a craft onto a traffic lane (runway, taxiway, parking area, etc.). Such unauthorized encroachments which inevitably give rise to risks of collision with possible aeroplanes taxiing or taking off or landing are, in essence, the consequence of a noncompliance (in large part through inattentiveness) with the taxiing authorizations provided by the airport or air traffic control authorities.

The continuous increase in air traffic and the growing complexity of the network of airport traffic lanes are favouring these risks of intrusion even more.

According to the rules currently in force, the taxiing of a craft on an airport is performed on request and by the commander of the craft, but according to the authorizations provided by the airport or air traffic control authorities in charge of ensuring the organized and safe flow of ground movements. The commander of the craft taxies his craft freely within the framework of the authorizations obtained.

Hitherto, compliance with the various constraints associated with airport surface taxiing and their compatibility with the authorizations granted has been performed visually by the commander of the craft. Likewise the surveillance of the airport surface taxiing movements and their compatibility with the authorizations granted has been performed visually by the airport or air traffic control authorities, very often with the aid of surveillance systems, based for the most part, on airport surface ground surveillance radars, and possibly supplemented in the last few years with multi-lateration ground systems using the data originating from onboard transponders.

On the basis of visual checking and of the position information provided by these airport surface ground surveillance systems, the airport or air traffic control authorities formulate, for the various craft, taxiing authorizations that are valid up to a so-called reporting point, where the craft must wait and obtain a new authorization to perform a new movement, doing so until it reaches its final destination.

The taxiing authorizations and their characteristics (route, compulsory reporting point) are very widely provided by speech (typically via a VHF radio channel). Hitherto, they have been taken into account mentally by the commander of the craft and rarely inserted into onboard systems.

Recently at a few airports and with a few airlines, these instructions may be provided to the aircraft by digital transmission by means of onboard equipment of the CPDLC type (the acronym standing for the expression: "Controller-Pilot Data Link Communications") in the form of standardized messages such as a PDC message (the acronym standing for the expression: "PreDeparture Clearances") via a VHF radio channel. The instructions are then displayed on an onboard screen (or even printed on board), but in general not inserted at the level of the other onboard systems. Such an insertion is nevertheless conceivable, at the very least manually, with the aid or otherwise of predefined lists of routes.

The reporting points marking the conclusions of the legs associated with the taxiing authorizations also known by various names: "Stop-bars" or "Holding points", "taxiway holding positions", "taxiway intersection markings", etc. are systematically placed at the thresholds of the crossings of the runways and of the taxiways but they may also be placed elsewhere in the traffic lanes of an airport.

Taxiing being left to the free initiative of the commander of the craft up to the reporting point, noncompliance (principally through inattentiveness) with the reporting point or with the route assigned may give rise to the abovementioned risks of "Runway Incursion" or "Runway Intrusion".

Hitherto, no operational system has been available on board an aircraft to aid the pilot to follow the route assigned to him by ground control and especially to signal to him any crossing of a compulsory reporting point that may or may not have been assigned to him (for example following a route error). Such functions are ensured only at the ground control level whereas they would be very useful on board a craft for assisting the commander of the craft to follow the routes corresponding to the taxiway authorizations.

The literature mentions various experiments conducted with a view to formulating onboard equipment facilitating the piloting of an aircraft during its taxiing on the surface of an airport especially in case of poor visibility. The article by Sharon Otero Beskenis et al, entitled "Integrated Display System For Low Visibility Landing and Surface Operations" published in July 1998 under the reference NASA/CR-1998-208446 describes an experiment with a Boeing B-757 type aircraft equipped with an HDD head-down display exhibiting a dropdown map of the airport pinpointing the aircraft on the traffic lanes of the airport by utilizing a geographical location fix delivered by a differential satellite positioning system and an electronic map of the airport, portraying the taxiing leg assigned to the aircraft by the airport traffic authorities, the reporting points delimiting the taxiing authorizations as well as reporting points transmitted by a runway anti-intrusion ground system dubbed AMASS (the acronym standing for the expression: "Airport Movement Area Safety System").

These conclusive experiments have had no immediate repercussion on account of the high level of equipment required for the ground installations of the airport. Since then, simpler systems have been proposed, rendering a less complete service but not necessitating particular equipment for the airport.

U.S. Pat. No. 6,606,563 describes an alert system tagging, by GPS positioning, the position of an aircraft on an airport surface modelled in an electronic map and signalling to the pilot that he is approaching or encroaching on a runway. This system which is a less secure variant of the AMASS system draws the pilot's attention to the fact that he is approaching or encroaching on a runway but does not aid him when taxiing to follow the route assigned to him by the airport traffic control authorities.

SUMMARY OF THE INVENTION

In view of the foregoing it is an object of this invention to signal to a craft travelling on the surface of an airport an incompatibility of the situation of the craft with flow constraints of the airport so as to allow him by himself to discard poor choices of route. Among the incompatibilities in relation to the flow constraints that may be signalled to a craft such as an aircraft, are:

- an abnormal situation or excessive proximity in relation to an element of the airport, such as air terminals, boarding gates, runways, taxiways,
- an incompatibility of the characteristics of an element of the airport, in particular of a traffic lane, runway or taxiway or parking area in relation to those of the aircraft, for example, maximum authorized weight and width or of the movement of the aircraft, for example, direction of travel, maximum authorized speed.

Briefly stated, the present invention is directed to a method of evaluating licitness of the situation of a craft on the surface of an airport comprising flow constraint zones, the said craft being provided with a geographical locating equipment, noteworthy in that it comprises the following steps:

- modelling of a first licitness cost surface covering a surface of the airport where the craft is deploying, termed the deployment surface, related to this deployment surface and defined by quantities assigned to its points, which quantities are representative of their memberships in flow constraint zones and of the severity in relation to the craft, of the flow constraints affecting the flow constraint zones concerned,
- modelling of a second licitness cost surface covering the deployment surface, related to the craft and defined by quantities assigned to its points, which quantities take account of the positions of the points relative to the craft and are representative of their memberships in a girth zone covering a neighbourhood of the current position of the craft, and
- calculation of a score evaluating the significance of the risk of violation of a flow constraint incurred by the craft on the basis of the cross-correlation function of the two licitness cost surfaces referred to one and the same benchmark.

Advantageously, the score evaluating the significance of the risk of violation of a flow constraint incurred by the craft is calculated on the basis of a cross-correlation function taking account only of a selection of unit products, which selection is made with the aid of a consideration function involving categories of zones or of parts of zones with flow constraint.

Advantageously, the score evaluating the significance of the risk of violation of a flow constraint incurred by the craft is calculated on the basis of a cross-correlation function taking account only of a selection of unit products, which selection is made with the aid of a consideration function involving categories of craft.

Advantageously, the score evaluating the significance of the risk of violation of a flow constraint incurred by the craft is calculated on the basis of a cross-correlation function taking account only of a selection of unit products, which selection is made with the aid of a consideration function involving categories of size zones or of parts of size zones of the craft.

Advantageously, the quantities of the points of the second licitness cost surface related to the craft also take account of the movement of the craft.

Advantageously, the first licitness cost surface related to the deployment surface presents, at the level of a flow constraint zone of oblong shape, a relief with transverse sections of Gaussian shape.

Advantageously, the second licitness cost surface related to the craft presents in the neighbourhood of the craft, a relief of oblong shape with transverse sections of Gaussian shape extending frontwards from the craft, in the direction of its movement.

Advantageously, the second licitness cost surface related to the craft presents in the neighbourhood of the craft, a relief whose shape corresponds to the short-term probabilities of presence of the craft at each of the points of the said neighbourhood.

Advantageously, the first licitness cost surface related to the deployment surface presents at the level of a flow constraint zone a pyramidal relief with concentric terraces.

Advantageously, the first and second licitness cost surfaces are defined in the form of samples resulting from one and the same meshing of the deployment surface.

Advantageously, when a flow constraint zone is an airport runway, it has a rectangular contour centred on the runway so as to encompass any point at a minimum distance from the axis or from the ends of the runway and supplemented with a crenellation encompassing the thresholds for access to the runway.

Advantageously, the second licitness cost surface related to the craft presents a relief covering the site occupied by the craft supplemented with margins taking account of the uncertainties in the determination of the position and of the heading of the craft, this relief being extended beyond the craft in the direction of its movement, over a distance dependent on its speed.

Advantageously, the samples of the licitness cost surfaces are associated with values of a consideration function making it possible to select the unit products used in the cross-correlation.

The present invention is also directed to a device for evaluating the licitness of the situation of a craft on the surface of an airport comprising flow constraint zones, the said craft being provided with a geographical locating equipment, the said device being noteworthy in that it comprises: a terrain database storing a first licitness cost surface covering the surface of the region where the craft is deploying, termed the deployment surface, related to this deployment surface and defined by quantities assigned to its points, which quantities are representative of their memberships in flow constraint zones and of the severity with respect to the craft, of the flow constraints affecting the flow constraint zones concerned and a second licitness cost surface covering the deployment surface, related to the craft and defined by the quantities assigned to its points, which quantities take account of the position of the points relative to the craft and are representative of their memberships in a girth zone covering a neighbourhood of the current position of the craft and calculation means producing a score evaluating the significance of a risk of violation of a flow constraint incurred by the craft by means of the cross-correlation function of the two dangerousness cost surfaces referred to one and the same benchmark.

Advantageously, the terrain database stores, associated with the samples of the licitness cost surfaces, values of a consideration function allowing the calculation means a selection of the unit products used by the cross-correlation function.

BRIEF DESCRIPTION OF THE DRAWINGS

Other characteristics and advantages of the invention will emerge from the description hereinafter, of an embodiment given by way of example. This description will be offered in conjunction with the drawing in which.

DETAILED DESCRIPTION OF THE EMBODIMENTS

Figure 1:
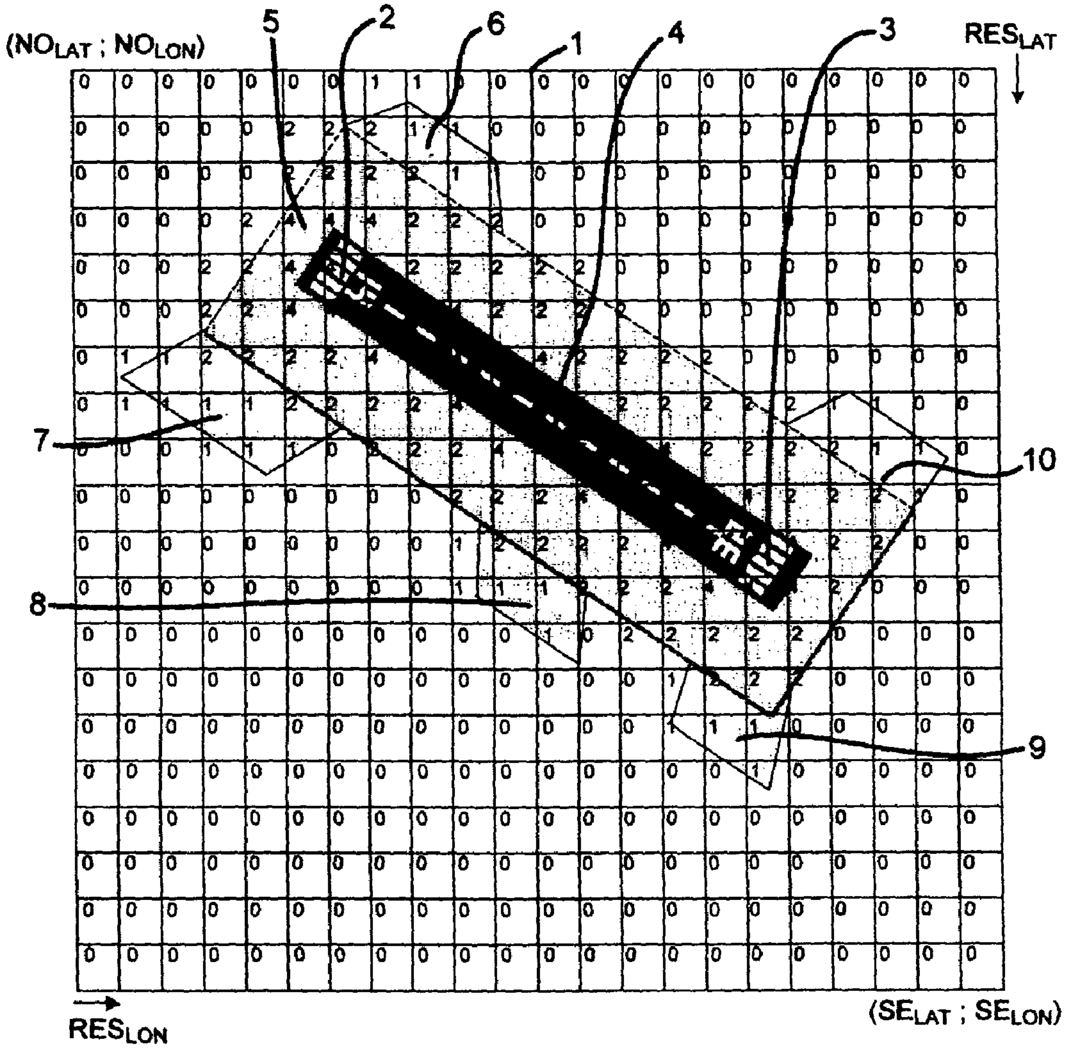
FIG. 1 shows an example of tagging and of scoring of a cost of intrinsic licitness of the points of an airport runway and of its environment by means of a geographical locating grid.

The constraints of flow on the surface of an airport are enacted by the authority managing the airport. They must be considered in the wide sense. They may be physical in nature such as for example the fact that an aircraft cannot pass through a building or approach it too closely. They may be regulatory in nature, such as for example a direction of traffic flow. They may be specific to a category of craft, the areas of traffic flow in respect of aircraft, service vehicles and pedestrians being so far as possible separated on the surface of an airport for obvious safety reasons or even specific to a type of craft, two types of aircraft not having the same requirements as regards leeway, ground resistance to the taxiing load, etc. They may be of an absolute character such as a weight limitation or a compulsory direction of traffic flow for a taxiway or a parking area or be of a relative character and be lifted on authorization from the ground traffic control authority as is the case for an airport runway which is normally prohibited to any traffic without express authorization from the control tower. Finally, they may consider several levels of severity of prohibition taking account of the significance of the risk of an accident in case of transgression. For example, any presence of a craft on an airport runway, its immediate environment and its access thresholds is prohibited without express authorization from the airport traffic control authority but the risk of an accident is much more significant for a presence on the runway strip which is allowed for in respect of taxiing on take-off or on landing than regarding the immediate neighbourhood of this strip or simply slightly beyond a runway entrance threshold.

The evaluation of a risk of violation of a flow constraint by a craft deploying within a surface comprising flow constraint zones is based on a cross-correlation of two costs: an intrinsic cost and an extrinsic cost of licitness, that are assigned to the points of the surface of deployment. The intrinsic licitness cost is a component of the risk of violation of a flow constraint due solely to the location of the point with respect to the flow constraint zones of the surface of deployment and to the severity of the flow constraints of these zones in relation to the craft. The extrinsic licitness cost is a component of the risk of violation of a flow constraint due solely to the location of the point with respect to the craft.

The intrinsic and extrinsic licitness costs of the points of the surface considered where the craft is deploying are fixed in an arbitrary manner and form licitness cost surfaces mapped by means of one and the same geographical locating grid which may be:

- a grid regular distance-wise, aligned with the meridians and parallels,
- a grid regular distance-wise aligned with the heading of the aircraft,
- a grid regular distance-wise aligned with the course of the aircraft,
- a grid regular angular-wise, aligned with the meridians and parallels,
- a grid regular angular-wise aligned with the heading of the aircraft,
- a grid regular angular-wise aligned with the course of the aircraft,
- a polar (radial) representation centred on the aircraft and its heading,
- a polar (radial) representation centred on the aircraft and its course.

Typically, the grid is composed of a set of polygons with four sides, conventionally squares or rectangles, but the grid may also be described by other types of polygons such as triangles or hexagons.

Subsequently in the description, use is made of a distance-wise regular locating grid 1, aligned with the meridians and parallels, and defined by its north-west ($NW_{LAT}$ and $NW_{LON}$) and south-east ($SE_{LAT}$ $SE_{LON}$) corners, with as angular resolution, $RES_{LAT}$ on the latitude axis and $RES_{LON}$ on the longitude axis.

In the figures, the proportions between the mesh cells of the locating grid and the surface areas of the flow constraint zones are not complied with, with a view to improving readability.

FIG. 1 shows an exemplary meshing of an intrinsic licitness cost surface at the level of a flow constraint zone plotted around two oppositely directed airport runways 2, 3 using the same strip 4 allowed for in respect of take-offs and landings.

This intrinsic licitness cost surface takes account of a flow constraint amounting to a prohibition of passage, so as to give the pilot a warning on crossing a runway threshold and to remind him of the need to obtain authorization from the airport surface traffic control authority to continue such a manoeuvre. The same flow constraint, namely a prohibition of passage may be repeated at the level of a taxiway, for example on account of a weight limitation exceeded by the aircraft. In this case, a warning of noncompliance with the flow constraint tells the pilot that he is about to commence taxiing on an erroneous route.

The intrinsic cost surface is defined by quantities at the level of the geographical locating grid mesh cells tagged by their positions within rows and columns of grid 1. The value of a sample or quantity is dependent on the geographical location of the mesh cell that it occupies in the locating grid with respect to the flow constraint zones. It is zero outside of a flow constraint zone and positive inside with a magnitude which represents the severity of the flow constraint or constraints imposed and which results from an arbitrary defining law. It takes account preferably of the number of flow restrictions imposed on the zone considered.

In the example represented, the flow constraint zone corresponding to the runways 2, 3 is extended to the strip 4 allowed for in respect of taxiing on take-off and on landing, to its immediate perimeter 5 and to the access thresholds 6, 7, 8, 9 and 10 of the taxiways. A high intrinsic licitness cost score, of value 4, is allocated to the samples of the mesh cells of the geographical locating grid intercepting the strip 4 of the runways 2, 3 since, without express authorization from the control tower, traffic flow there is not only prohibited but very dangerous. An average intrinsic licitness cost score, of value 2, is allocated to the samples of the mesh cells of the geographical locating grid that are situated in the immediate perimeter of the strip 4 of the runways 2, 3, at a distance with respect to the axis or to the ends of the strip 4 of the runways 2, 3, that is less than an arbitrary threshold, for example 50 metres since, without express authorization from the control tower, traffic flow there is prohibited and relatively dangerous. These mesh cells situated at the immediate periphery of the strip 4 form, with the latter, the immediate perimeter 5, which is a rectangle centered on the axis of the runways 2, 3. A low intrinsic licitness cost score, of value 1, is allocated to the samples of the mesh cells of the geographical locating grid that are situated on the access thresholds 6, 7, 8, 9, 10 of the taxiways to the runways 2, 3 since crossings thereof are prohibited save for express authorization from the control tower. Finally, a score of absence of intrinsic dangerousness, of zero value is allocated to the samples of all the other mesh cells of the geographical locating grid.

The intrinsic licitness cost surface is extended to the whole of the surface of the airport zone (runways, taxiway, buildings, etc.) in which the aircraft might move. It is stored by samples which are stored in a terrain database which also stores the samples of the intrinsic licitness cost surfaces of the other airports frequented by the aircraft. It is updated should the configuration of the flow constraint zones be modified. If the taxiing authorizations are communicated to the aircraft by digital transmission, it is possible to consider them within the definition of the intrinsic licitness cost surface by updates to which they give rise, the consideration consisting in zeroing the quantities of the points of the flow constraint zones placed on the route corresponding to the last taxiing authorization received.

Figure 2:
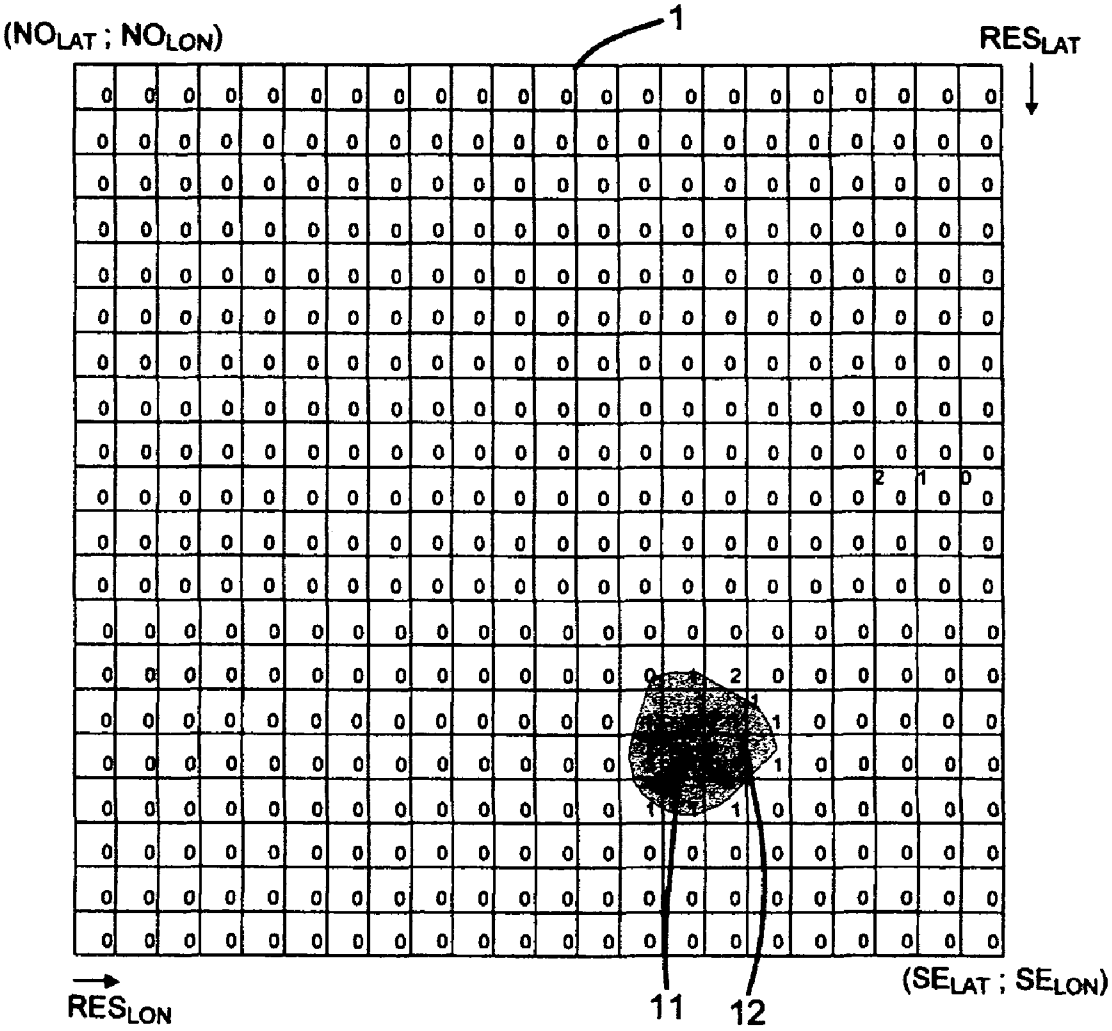
FIG. 2 shows an example of tagging and of scoring of a cost of extrinsic licitness of the points of the immediate environment of an aircraft by means of the same locating grid as that used in FIG. 1.

FIG. 2 shows an exemplary extrinsic licitness cost surface related to an aircraft 11 and sampled by means of the same geographical locating grid 1 as the exemplary intrinsic licitness cost surface of FIG. 1. The value of a sample or quantity of this extrinsic licitness cost surface is dependent on the location of the mesh cell that it occupies in the geographical locating grid, with respect to the position of the craft which here is an aircraft 11.

Like the scoring of intrinsic licitness cost, the scoring of extrinsic licitness cost and its scale are arbitrary, the only imperative being that an absence of flow constraint arising from the girth of the aircraft be made to correspond with a zero value or a value below a predefined threshold.

In the example represented, a nonzero extrinsic licitness cost score of value 1 is allocated to the mesh cells of a surface 12 of the neighbourhood of the instantaneous position of the aircraft 11, the contour of which is devised as a function of the instantaneous position of the aircraft, of its short-term forecastable position, of its heading and possibly of its speed. A score of absence of extrinsic licitness cost, of zero value is allocated to the samples of all the other mesh cells of the geographical locating grid.

This extrinsic licitness cost surface, which is related to the aircraft, is periodically updated to take account of the movement of the aircraft 11.

The extrinsic licitness cost surface and the intrinsic cost surface are used for a cross-correlation from which is deduced an evaluation of the risk of violation of a flow constraint. More precisely, an evaluation E of risk of violation of a flow constraint by a craft A with respect to flow constraint zones Z is taken equal to the value of the cross-correlation function of the intrinsic licitness cost surface related to the flow constraint zones Z and of the extrinsic licitness cost surface related to the craft A:

$$E = \int_{Grid} S_Z(x, y) \times S_A(x, y)$$

$S_Z(x,y)$ being the samples of the intrinsic licitness cost surface that are tagged in the geographical locating grid 1 by an abscissa x corresponding to a latitude and by an ordinate y corresponding to a longitude, $S_A(x,y)$ being the samples of the extrinsic licitness cost surface that are tagged in the geographical locating grid 1 by an abscissa x corresponding to a latitude and by an ordinate y corresponding to a longitude.

Figure 3:
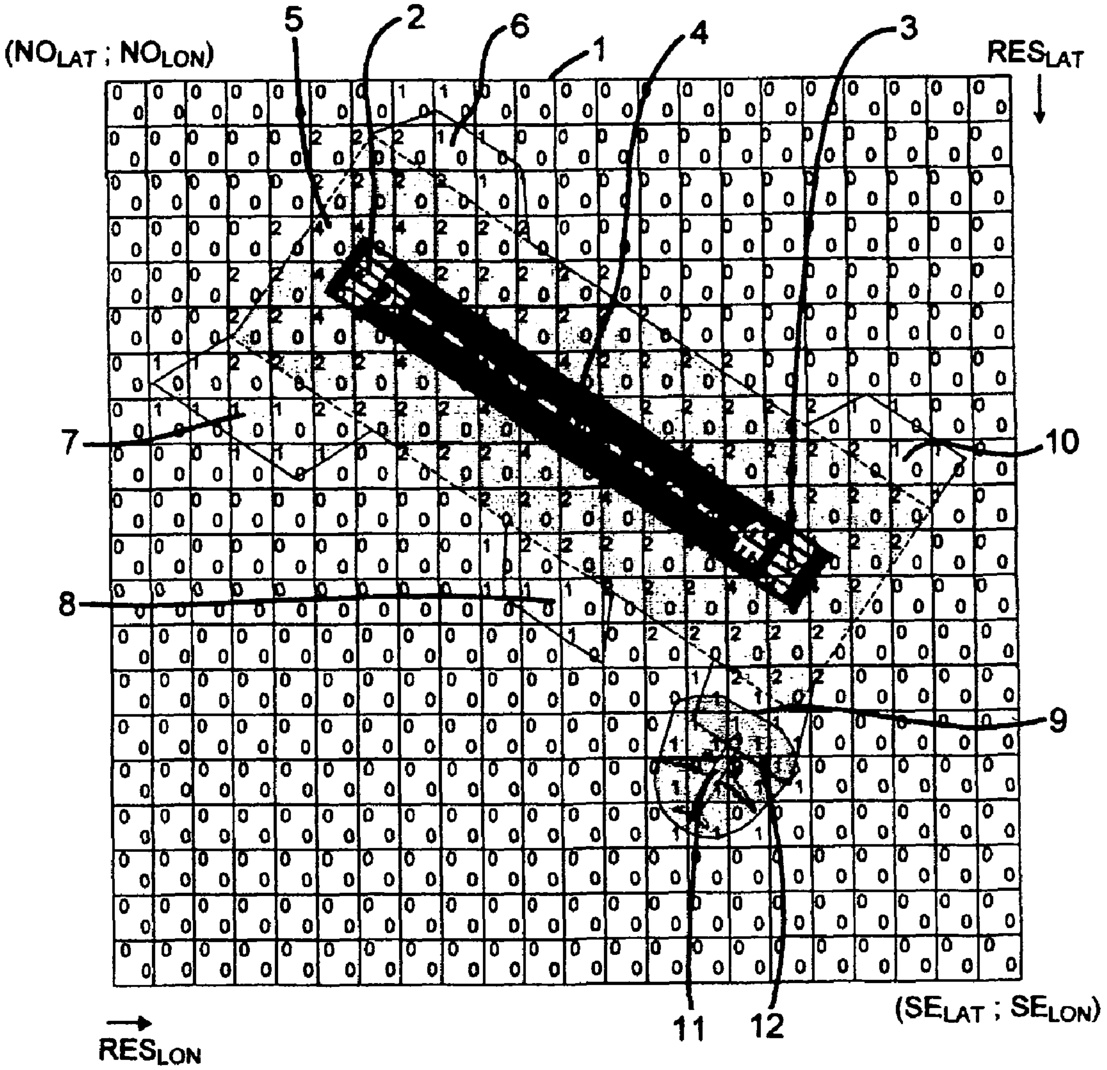
FIG. 3 is a superposition of FIGS. 1 and 2 showing the way in which the scores of intrinsic and extrinsic costs of licitness are cross-correlated to evaluate a risk of violation of a flow constraint in a method according to the invention.
Figure 4:
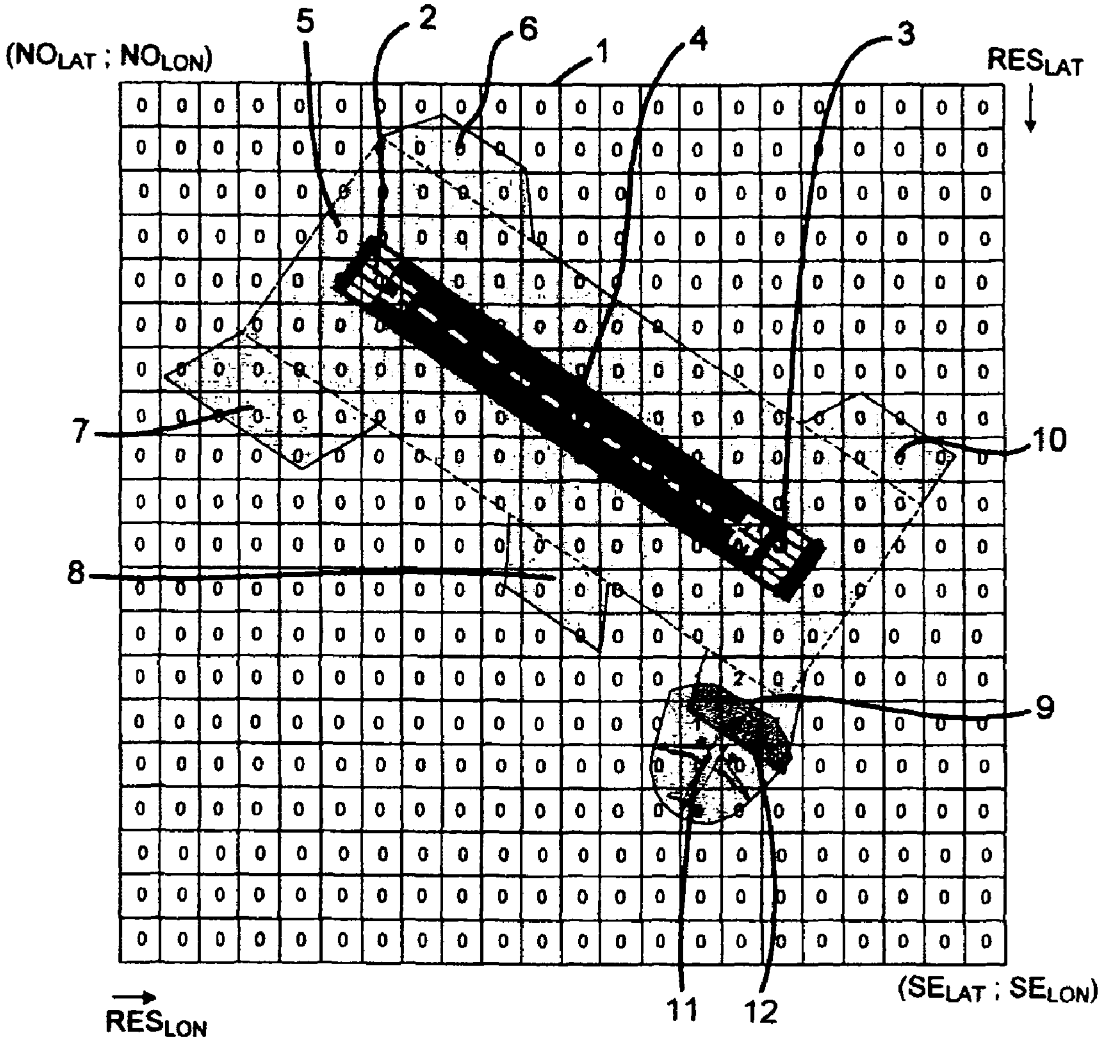
FIG. 4 is an advancement of FIG. 3 showing the unit products of cross-correlation of the scores of intrinsic and extrinsic licitness costs.

The effect of a cross-correlation of the two licitness cost surfaces is illustrated by FIGS. 3 and 4.

FIG. 3 shows the elements considered in the unit products of the cross-correlation by simple superposition of the intrinsic licitness cost surface and of the extrinsic licitness cost surface both referred to the same geographical locating grid 1. Each mesh cell of the geographical locating grid presents, in its top-left corner, a value of intrinsic licitness cost corresponding to the sample of the intrinsic licitness cost surface and, in its bottom-right corner, a value of extrinsic licitness cost corresponding to the sample of the extrinsic licitness cost surface.

FIG. 4 shows the unit products obtained for each mesh cell of the geographical locating grid 1. These unit products are zero for a great majority, with the exception of the mesh cells intercepting at one and the same time a flow constraint zone, here the access threshold 9 to the runway 3, and the neighbourhood surface 12 of the aircraft 11, that is considered in respect of the extrinsic licitness cost.

The sum of the unit products appearing in FIG. 4 equals 7. It corresponds to the value of the cross-correlation function between the two intrinsic and extrinsic licitness cost surfaces and is taken as evaluation of the risk of violation of a flow constraint by the aircraft 11 in the flow constraint zone surrounding the runways 2, 3.

Figure 5:
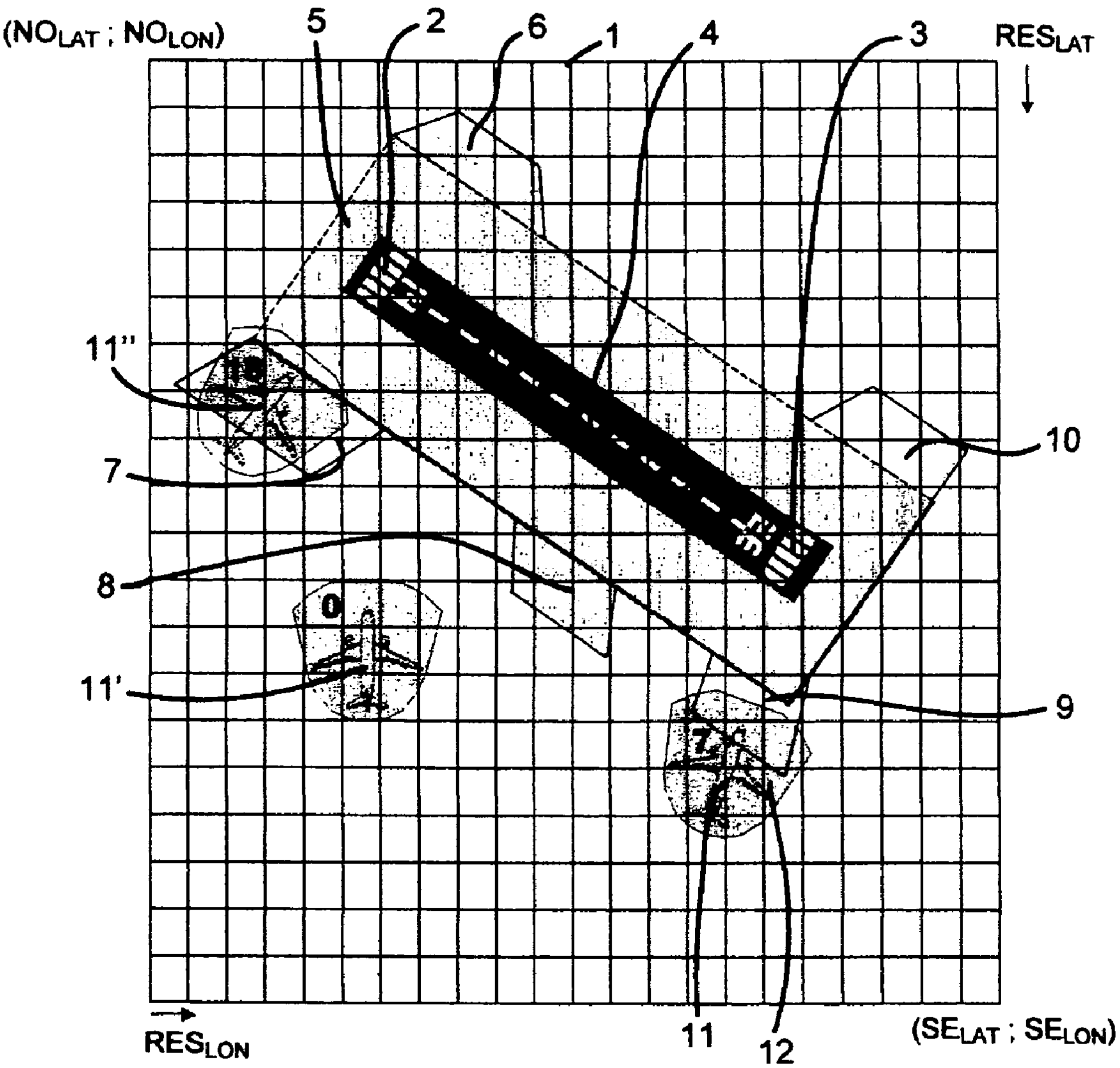
FIG. 5 is a variant of FIG. 3 showing the dependence of the evaluation of a risk of violation of a flow constraint, by a method according to the invention, in relation to the position of the aircraft with respect to a runway.

FIG. 5 gathers together the values taken by the cross-correlation function for various positions of an aircraft in relation to the flow constraint zone already represented in FIGS. 1, 3 and 4. This FIG. 5 repeats the position of the aircraft 11 shown in FIG. 4 for which the cross-correlation function takes the value 7. It shows a second aircraft 11' remote from the flow constraint zone surrounding the runways 2, 3 and for which aircraft the cross-correlation function takes a zero value since the neighbourhood surface considered in respect of the extrinsic licitness cost does not intercept the flow constraint zone surrounding the runways 2, 3. It also shows a third aircraft 11" that has penetrated much further than the other two 11 and 11' into the flow constraint zone surrounding the two runways 2, 3, and for which the cross-correlation function takes the value 18.

Thus, the value of the cross-correlation function between the two intrinsic and extrinsic licitness cost surfaces gives an evaluation of a risk of violation of a flow constraint increasing with the depth of encroachment of the craft into a flow constraint zone.

This way of evaluating a risk of violation of a flow constraint by a craft deploying among flow constraint zones can be refined by a particular modelling (contour and sections) of the reliefs presented by the intrinsic licitness cost surface at the level of a flow constraint zone and by the extrinsic licitness cost surface in the neighbourhood of the craft. It may also be refined by application of a condition to the consideration of each unit product in the cross-correlation.

In the example just described, the intrinsic licitness cost surface presents, at the level of the flow constraint zone surrounding the runways 2, 3, a pyramidal relief with concentric terraces, with, at the periphery, a first level of terraces covering the thresholds for access 6, 7, 8, 9 of the runways 2, 3 to the taxiways and corresponding to the value 1 then, set back, a second level of terraces covering the immediate environment 5 of the runways 2, 3 and corresponding to the value 2, and, again set back, a third level of terraces extending above the runways 2, 3 and corresponding to the value 4. This same kind of form of relief involving concentric terraces can be adopted for flow constraint zones of any sort.

Figure 6:
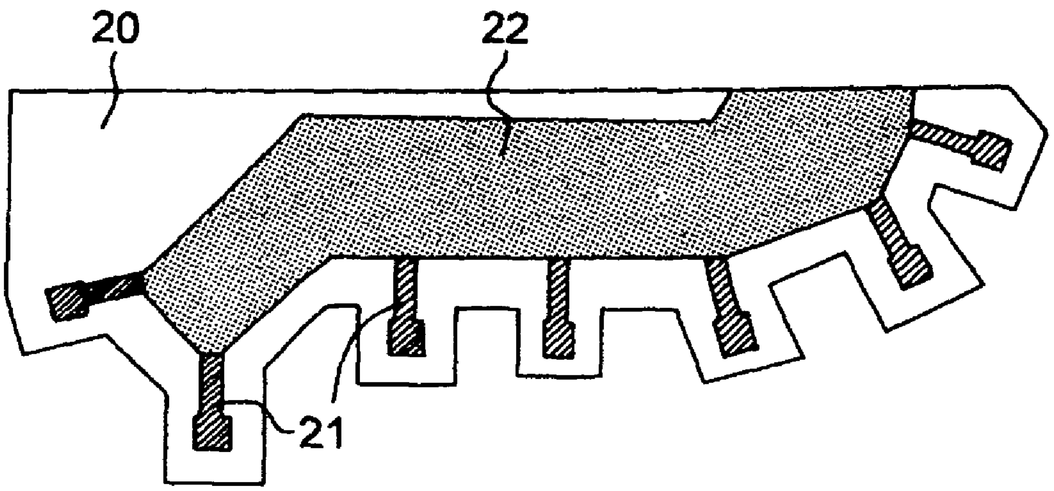
FIG. 6 shows an exemplary modelling as tiered and concentric terraces, of an intrinsic licitness cost surface, at the level of an airport passenger boarding terminal.

FIG. 6 shows its adaptation to an airport terminal for the boarding of passengers. The corresponding relief in the intrinsic licitness cost surface presents a first level of terraces, for example of value 1, covering the immediate environment 20 of the building 22 of the terminal and gangways 21 for access to the aircraft, a second level of terraces, for example of value 2, covering the swing spaces of the orientable gangways 21 for access to the aircraft and a third level of terraces for example of value 4, covering the building 22 of the terminal.

Figure 7:
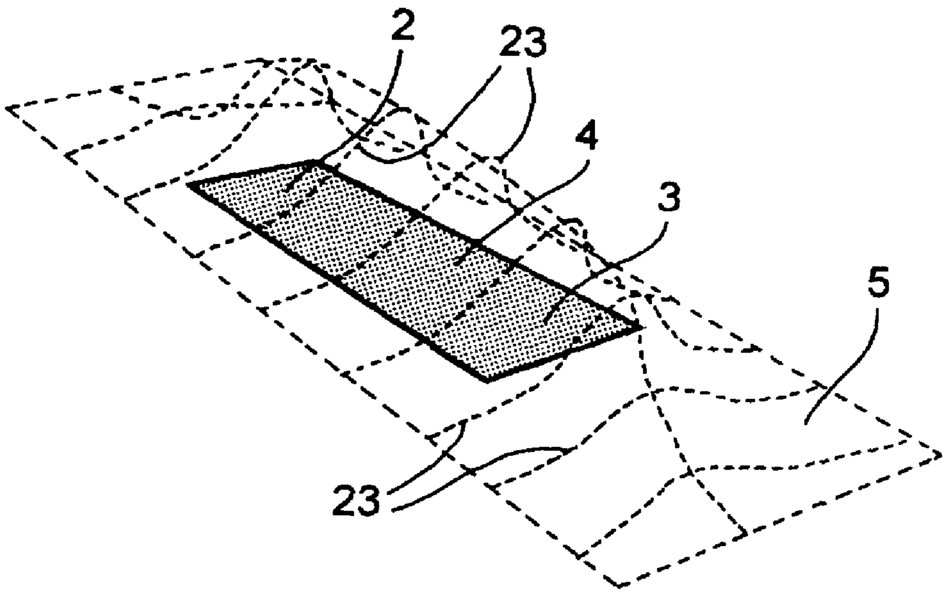
FIG. 7 shows an exemplary modelling as Gaussian volumes, of an intrinsic licitness cost surface at the level of an airport runway.

Other forms of relief are also suitable for example, forms with Gaussian sections defined by mathematical functions involving $e^{-x^2}$ (e being the exponential function) discretized or otherwise. FIG. 7 gives an example of this kind of form of relief with Gaussian sections 23 for an intrinsic licitness cost surface at the level of the two oppositely directed landing runways 2, 3, using the same rolling strip 4 and of their immediate environment.

Figure 8A:
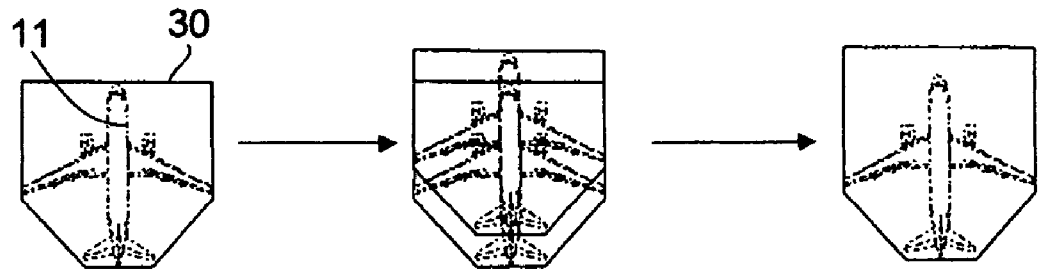
FIGS. 8*a*, 8*b* and 8*c* show a way of plotting the contour of the neighbourhood of an aircraft used in a method according to the invention for devising scores of extrinsic licitness cost.
Figure 8B:
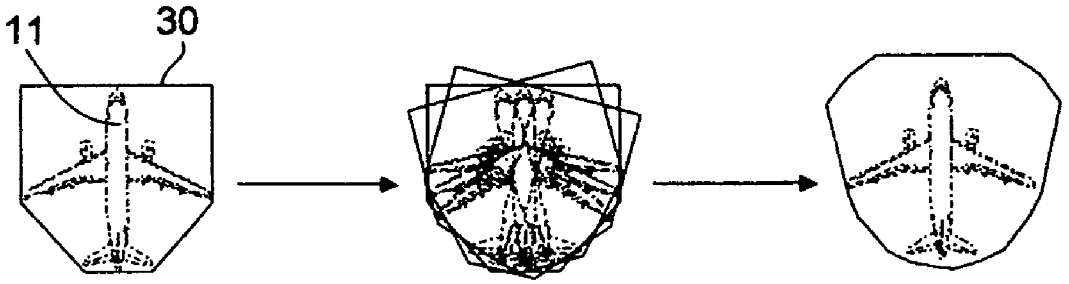
Figure 8C:
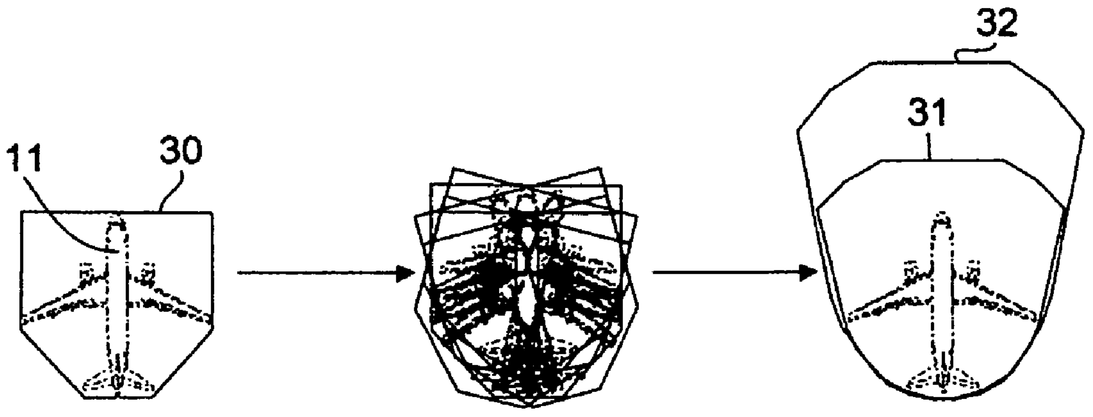

FIGS. 8*a*, 8*b*, 8*c* show a way of determining the contour of the surface 12 of the neighbourhood of the current position of the aircraft 11 on the basis of the definition of an extrinsic licitness cost surface. This surface 12 of the neighbourhood of the aircraft 11 is the surface swept by a substantially square form 30, with two folded-back edges, and in which is inscribed a transport aircraft whose length is substantially equal to the wing span, displaced longitudinally, as shown in FIG. 8*a*, so as to take account of an uncertainty in position due to the speed of taxiing, and angularly, as shown in FIG. 8*b*, to take account of an uncertainty in heading due to the angular rate of change of heading. As shown in FIG. 8*c*, these two displacements combined lead to the neighbourhood surface of the current position of the aircraft 11 being given a contour 31 exhibiting resemblances with that of a Saint Jacques shell or coat of arms for craft of the aircraft type. For craft of the car or lorry type the resulting contour is in general close to a rectangle. This contour 31 may also depend on the speed of taxiing of the aircraft and, as represented at 32, have a forward front which recedes from the aircraft 11 as the latter picks up speed. Longitudinal and transverse margins may also be added so as to give a passage tolerance.

Figure 9:
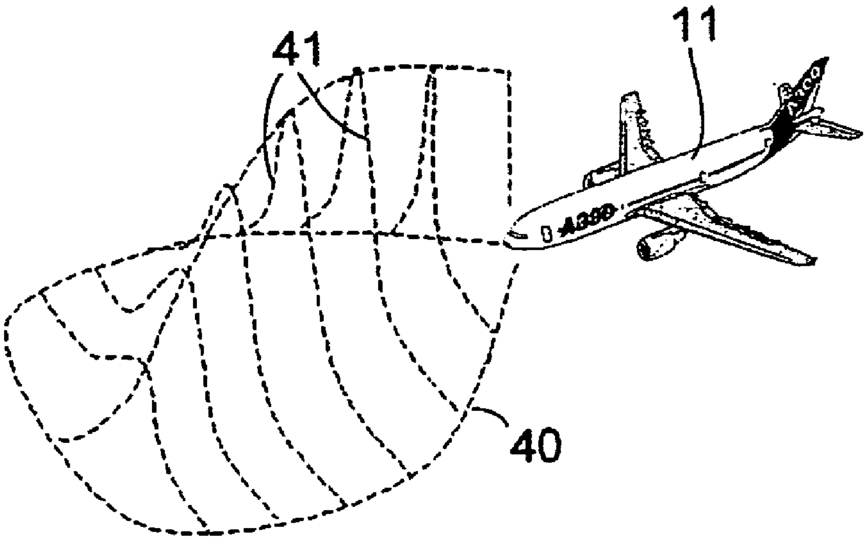
FIG. 9 shows an exemplary modelling with Gaussian volumes, of an extrinsic licitness cost surface in the neighbourhood of an aircraft.

The form of the relief occupying, in the extrinsic licitness cost surface, the surface 12 of the neighbourhood of the aircraft 11 may be that of a plateau with constant level as has been assumed in the example described previously with regard to FIGS. 2, 3, 4. It may also be, that 40 of FIG. 9, which has Gaussian sections 41 defined by mathematical functions involving $e^{-x^2}$ (e being the exponential function) representing the probability of short-term presence of the aircraft at each point. Furthermore, it is noted that the surface 12 of the neighbourhood of the aircraft 11 does not necessarily include the current position of the aircraft but the most probable short-term positions.

The application of a condition to the consideration of each unit product in the cross-correlation makes it possible to involve compatibility links between various categories of zones or of parts of flow constraint zones and various categories of zone or of parts of zone of neighbourhood of the craft, for example to specify zones with flow regulated as a function of the kind of craft (a car not having to take account of the same obstacles as an aircraft in an airport zone) or as a function of the configuration of the craft (the wings of an aircraft possibly passing above certain low obstacles such as traffic lights, but not its landing gear).

Figure 10:
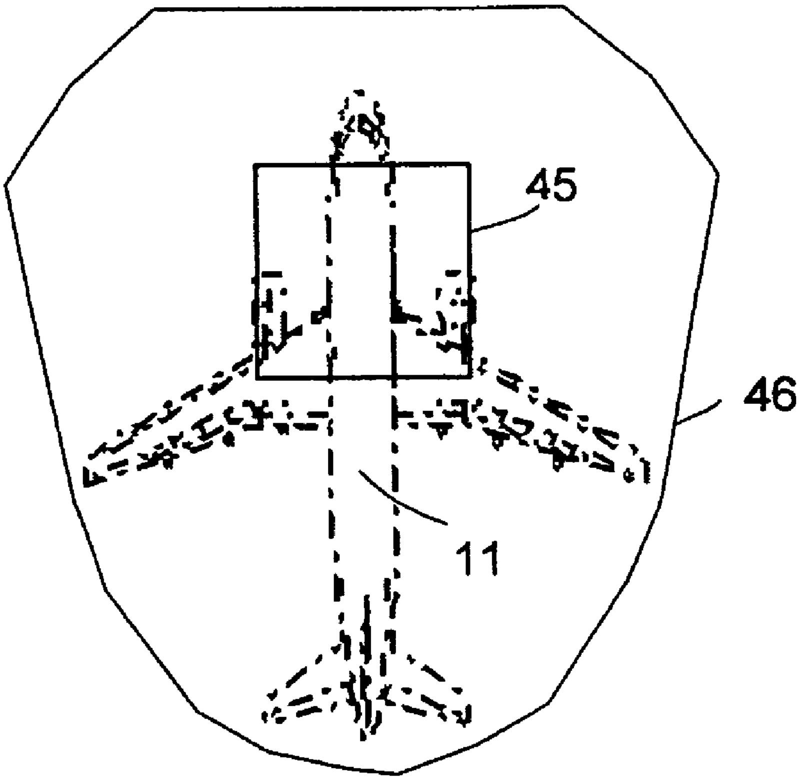
FIG. 10 shows a neighbourhood of an aircraft used in a method according to the invention for the devising of the scores of extrinsic licitness cost and composed of two regions of different categories.

FIG. 10 shows an exemplary surface of the neighbourhood of the aircraft 11, which is used for the determination of the extrinsic licitness cost surface and which comprises two parts: a small region 45 in which is inscribed the support polygon of the aircraft delimited by its landing gear in the extended position and a wider region 46 of deployment in the form of a coat of arms in which the aircraft 11 is inscribed as was described in relation to FIGS. 8*a*, 8*b*, 8*c*. This surface of the neighbourhood of the aircraft 11 with two regions 45, 46 is provided for the application of a condition for considering each unit product in a cross-correlation. More precisely, the points of the small support region 45, which are tagged with respect to the geographical locating grid, are not subject to any condition of consideration of the cross-correlation unit products while those of the region 46 of deployment are subject to a condition of consideration of the correlation unit products consisting in verifying that the other term of the product arises from a point belonging to an obstacle of a height greater than a minimum threshold chosen as a function of the height of the root of the wings of the aircraft. In this example, there are two types of zones or of points of a zone with flow constraint: those zones or points exhibiting obstacles of a lower height than the threshold and the others, and two types of aircraft neighbourhood surface: the support region 45 and the region of deployment 46 with total compatibility between the support region and the whole set of flow constraint zones, and compatibility of the region of deployment 46 limited to the zones or to the points of the zones with flow constraint exhibiting obstacles of a greater height than the threshold.

Figure 11:
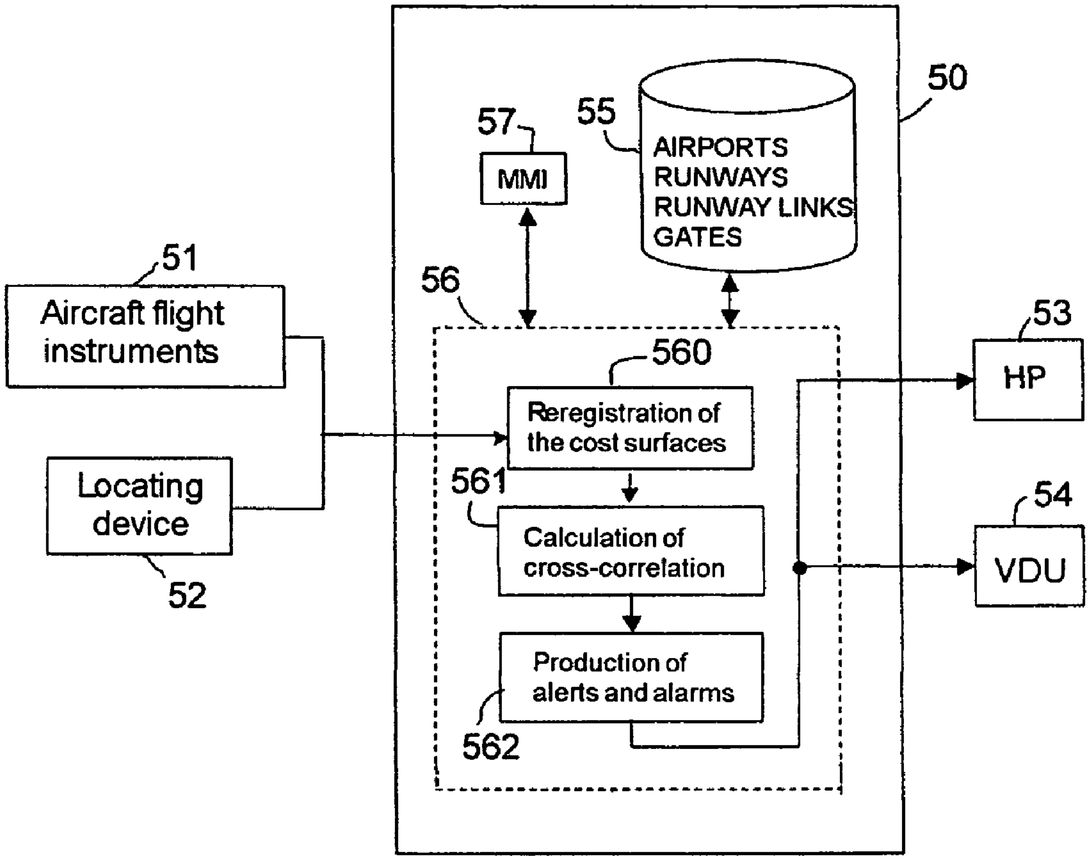
FIG. 11 is a diagram of an onboard device for evaluating risk of violation of a flow constraint according to the invention.

As shown in FIG. 11, an onboard device 50 for evaluating violation of a flow constraint is inserted into the onboard equipment of an aircraft between the flight instruments 51, a geographical locating device 52, for example a receiver of a GNSS satellite positioning system (the acronym standing for the expression: "Global Navigation Satellite System") such as GPS (the acronym standing for the expression: "Global Positioning System") possibly being used moreover by a flight management computer (not represented), possibly supplemented with other systems (not represented) for precise positioning (such as sensors for following lines on the ground), and alert emitters placed in the cockpit, either of audible or vocal type 53: loudspeaker (HP), siren, buzzer, etc., or of visual type 54: indicator light, message or graphical indication or symbols on a risk map display screen, etc. It comprises chiefly:

- a database 55 holding an intrinsic licitness cost score associated with elements relating to airports frequented by the aircraft, an extrinsic licitness cost score related to the configuration of the aircraft and, possibly, cross-correlation unit product consideration values associated with both scores,
- a computer 56 utilizing the information arising from the flight instruments 51, from the geographical locating device 52 and from the airport database 55 to produce alerts relayed to the cockpit by the alert and alarm emitters 53, 54, and, advantageously:
- a man/machine interface MMI 57, for example an MCDU (the acronym standing for the expression: "Multipurpose Control Display Unit") allowing parameter setting by a member of the crew of the aircraft or of a maintenance team,
- a datalink for updating data of the airport database with the help of information transmitted by ground systems managed in general by the airport authorities or the air traffic control.

The computer 56 is configured to implement a method of evaluating a risk of violation of a flow constraint and of generating alerts comprising the following successive steps:

- reregistration, at 560, of the extrinsic licitness cost surface with respect to the intrinsic licitness cost surface with the help of the information regarding the position, the heading and possibly the speed of the aircraft, as provided by the flight instruments 51, the locating device 52, and with the help of the scores contained in the airport database 55,
- calculation, at 561, of the cross-correlation function between the two intrinsic and extrinsic licitness cost surfaces previously reregistered, possibly with selection of the unit products considered as a function of consideration values associated with their terms, and
- production, at 562, of the alerts as a function of the value obtained for the cross-correlation function if a predefined threshold is exceeded with indication of the significance of the risk of violation of a flow constraint based on the value of the cross-correlation.

The values of consideration of a unit product in a cross-correlation which are values associated with each sample of cost surface define categories of samples compatible between the two surfaces. They must for example be identical for both terms of a unit product to be considered in the cross-correlation.

With such a device, the pilot of a craft deploying among flow constraint zones is alerted as soon as his route leads him to have to comply with a new flow constraint. This alert arouses his attention and leads him to ask himself whether he has indeed obtained the necessary authorizations and, in the opposite case, whether he has not gone wrong, thereby giving him the possibility of reacting before his manoeuvre endangers his safety and that of the other craft deploying in his vicinity. In an airport environment, the device allows an aircraft pilot to appreciate an abnormal situation such as an excessive proximity of his aircraft in relation to air terminals, boarding gates, reporting points, runways, taxiways, etc. since these elements constitute zones with flow constraints imposing minimum values of separation from the infrastructures. He is also warned of an incompatibility of the characteristics of his craft, weight, girth with a runway traffic lane or taxiway that he is approaching or attempting to follow. He may even be warned of an incompatibility of the situation of his aircraft with respect to the taxiing authorizations delivered by the traffic control authority, if these taxiing authorizations received by phone or by digital transmission are exploited in order to keep up-to-date the flow regulations considered in the determination of the intrinsic licitness cost surfaces.

The invention claimed is:

1. A method for evaluating licitness of the situation of a craft on the surface of an airport including: flow constraint zones, the craft being provided with a geographical locating equipment, the method comprising the steps of:

- receiving by a computer location information of the craft from the geographical locating equipment;
- modelling, by operation of the computer, a first licitness cost surface covering a surface of the airport where the craft is deployed, the first licitness cost surface being defined by quantities assigned to its points, which quantities are representative of their memberships in flow constraint zones and of the severity in relation to the craft, of the flow constraints affecting the flow constraint zones concerned,
- modelling, by operation of the computer, a second second licitness cost surface covering the first licitness cost surface, related to the craft and defined by quantities assigned to its points, which quantities are representative of their memberships in a girth zone covering a neighbourhood of the current position of the craft, and
- calculating, by operation of the computer, a score evaluating the significance of the risk of violation of a flow constraint incurred by the craft on the basis of a cross-correlation function of the two licitness cost surfaces referred to one and the same benchmark.

2. The method according to claim 1, wherein the score evaluating the significance of the risk of violation of a flow constraint incurred by the craft is calculated on the basis of a cross-correlation function taking account only of a selection of the unit products, which selection is made with the aid of a consideration function involving categories of zones or of parts of zones with flow constraint.

3. The method according to claim 1, wherein the score evaluating the significance of the risk of violation of a flow constraint incurred by the craft is calculated on the basis of a cross-correlation function taking account only of a selection of unit products, which selection is made with the aid of a consideration function involving categories of craft.

4. The method according to claim 1, wherein the score evaluating the significance of the risk of violation of a flow constraint incurred by the craft is calculated on the basis of a cross-correlation function taking account only of a selection of unit products, which selection is made with the aid of a consideration function involving categories of neighbourhood zones or of parts of zones of the neighbourhood of the craft.

5. The method according to claim 1, wherein the quantities of the points of the second licitness cost surface related to the craft also take account of the movement of the craft.

6. The method according to claim 1, wherein the first licitness cost surface related to the deployment surface presents, at the level of a flow constraint zone of oblong shape, a relief with transverse sections of Gaussian shape.

7. The method according to claim 1, wherein the second licitness cost surface related to the craft presents in the neighbourhood of the craft, a relief of oblong shape with transverse sections of Gaussian shapes extending frontwards from the craft, in the direction of its movement.

8. The method according to claim 7, wherein the second licitness cost surface related to the craft presents in the neighbourhood of the craft, a relief whose shape corresponds to the short-term probabilities of presence of the craft at each of the points of the said neighbourhood.

9. The method according to claim 1, wherein the first licitness cost surface related to the deployment surface presents at the level of a flow constraint zone a pyramidal relief with concentric terraces.

10. The method according to claim 1, wherein the first and second licitness cost surfaces are defined in the form of samples resulting from one and the same meshing of the deployment surface.

11. The method according to claim 1, wherein a flow constraint zone covering an airport runway has a rectangular contour centred on the runway so as to encompass any point at a minimum distance from the axis or from the ends of the runway and supplemented with a crenellation encompassing the thresholds for access to the runway.

12. The method according to claim 1, wherein the second licitness cost surface related to the craft presents a relief covering the site occupied by the craft supplemented with margins taking account of the uncertainties in the determination of the position and of the heading of the craft, this relief being extended beyond the craft in the direction of its movement, over a distance dependent on its speed.

13. The method according to claim 11, wherein the samples of the licitness cost surfaces are associated with values of a consideration function making it possible to select the unit products used by the correlation function.

14. The method according to claim 1, wherein the craft is an aircraft.

15. A device for evaluating the licitness of the situation of a craft on the surface of an airport comprising flow constraint zones, said craft being provided with geographical locating equipment, said device comprising:

- a terrain database storing a first licitness cost surface covering the surface of the airport where the craft is deployed, the first lictness cost defined by quantities assigned to its points, which quantities are representative of their memberships in flow constraint zones and of the severity with respect to the craft, of the flow constraints affecting the zones concerned;
- a second licitness cost surface covering the deployment surface, related to the craft and defined by the quantities assigned to its points, which quantities are representative of their memberships in a girth zone covering the neighbourhood of the current position of the craft;
- a computer configured to utilize information from aircraft flight instruments, the geographic locating equipment, and the terrain database, the computer comprising calculation means for producing a score evaluating the significance of a risk of violation of a flow constraint incurred by the craft on the basis of the cross-correlation function of the two dangerousness cost surfaces referred to one and the same benchmark; and
- a man machine interface in electrical communication with the computer, the man machine interface configured to receive a parameter setting.

16. The device according to claim 15, wherein the terrain database stores, associated with the samples of the licitness cost surfaces, values of a consideration function allowing the calculation means a selection of the unit products used by the cross-correlation function.

* * * * *